United States Patent
Kawanami (10) Patent No.: US 9,496,758 B2
(45) Date of Patent: Nov. 15, 2016

(54) ROTOR FOR ROTATING ELECTRIC MACHINE

(71) Applicant: HONDA MOTOR CO., LTD., Tokyo (JP)

(72) Inventor: Koji Kawanami, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 325 days.

(21) Appl. No.: 14/180,271

(22) Filed: Feb. 13, 2014

(65) Prior Publication Data
US 2014/0225471 A1    Aug. 14, 2014

(30) Foreign Application Priority Data

Feb. 14, 2013  (JP) .................................. 2013-026938

(51) Int. Cl.
 *H02K 1/27*   (2006.01)
 *H02K 1/30*   (2006.01)

(52) U.S. Cl.
 CPC ............ *H02K 1/2706* (2013.01); *H02K 1/274* (2013.01); *H02K 1/276* (2013.01); *H02K 1/30* (2013.01)

(58) Field of Classification Search
 CPC .......... H02K 1/22; H02K 1/27; H02K 1/2706; H02K 1/272; H02K 1/274; H02K 1/2746; H02K 1/2753; H02K 1/2766; H02K 1/278; H02K 1/28; H02K 1/30
 USPC ...................... 310/156.53, 156.56; 74/572.21
 See application file for complete search history.

(56) References Cited

U.S. PATENT DOCUMENTS

| | | | | |
|---|---|---|---|---|
| 670,388 | A | * | 3/1901 | Howland-Sherman . F16F 15/30 74/572.21 |
| 4,128,780 | A | * | 12/1978 | Sonobe .................... H02K 1/30 310/265 |
| 6,717,315 | B1 | * | 4/2004 | Tajima ................... H02K 1/278 310/156.45 |

(Continued)

FOREIGN PATENT DOCUMENTS

| | | | |
|---|---|---|---|
| EP | 0813200 | * 12/1997 | ........... G11B 23/037 |
| JP | 3746885 B2 | 4/1999 | |

(Continued)

OTHER PUBLICATIONS

Chinese Office Action for corresponding CN Application No. 201410045530.8, Dec. 2, 2015 (w/ English translation including machine translation).

*Primary Examiner* — Burton Mullins
(74) *Attorney, Agent, or Firm* — Mori & Ward, LLP (57) ABSTRACT

A rotor for a rotating electric machine includes a rotor core, a plurality of permanent magnets, and a rotating shaft. The rotor core includes a through-hole, an inner circumference-side rotor core, an outer circumference-side rotor core, and a plurality of ribs. Each of the plurality of ribs includes a first curved rib and a second curved rib. The first curved rib extends to one side in a circumferential direction from an inner circumference side toward an outer circumference side. The first curved rib has a curved shape that bulges toward the outer circumference side and toward another side in the circumferential direction beyond a straight line that connects a first connecting portion between the first curved rib and the inner circumference-side rotor core and a second connecting portion between the first curved rib and the outer circumference-side rotor core.

5 Claims, 11 Drawing Sheets

(56) References Cited

U.S. PATENT DOCUMENTS

| | | | | |
|---|---|---|---|---|
| 7,619,342 B2* | 11/2009 | Malmberg | ............ | H02K 1/2766 |
| | | | | 310/156.48 |
| 8,487,495 B2* | 7/2013 | Takizawa | ................ | H02K 1/276 |
| | | | | 310/156.01 |
| 8,729,767 B2* | 5/2014 | Feuerrohr | ............ | H02K 1/2773 |
| | | | | 310/216.069 |
| 2004/0045399 A1* | 3/2004 | Hadi | ................... | F16F 15/1428 |
| | | | | 74/572.21 |
| 2011/0278977 A1* | 11/2011 | Utaka | ................. | H02K 1/2766 |
| | | | | 310/156.53 |
| 2012/0256516 A1* | 10/2012 | Matsushita | .............. | H02K 1/28 |
| | | | | 310/216.123 |

FOREIGN PATENT DOCUMENTS

| | | | | | |
|---|---|---|---|---|---|
| JP | 2002-191144 | | 7/2002 | | |
| JP | 2004-194419 | | 7/2004 | | |
| JP | 2008-167549 | * | 7/2008 | .............. | H02K 1/27 |
| JP | 2009-011011 | | 1/2009 | | |
| JP | 2012-075208 | * | 4/2012 | .............. | H02K 1/27 |

* cited by examiner

BACKGROUND ART

FIG. 11

BACKGROUND ART

ROTOR FOR ROTATING ELECTRIC MACHINE

CROSS-REFERENCE TO RELATED APPLICATIONS

The present application claims priority under 35 U.S.C. §119 to Japanese Patent Application No. 2013-026938, filed Feb. 14, 2013, entitled "Rotor for Rotating Electric Machine." The contents of this application are incorporated herein by reference in their entirety.

BACKGROUND

1. Field

The present disclosure relates to a rotor for a rotating electric machine.

2. Description of the Related Art

In related art, as a rotor for use in a rotating electric machine, there exists a rotor having a plurality of permanent magnets arranged in a rotor core at predetermined intervals in the circumferential direction (see, for example, Japanese Patent No. 3746885 and Japanese Unexamined Patent Application Publication No. 2004-194419).

Figure 10:
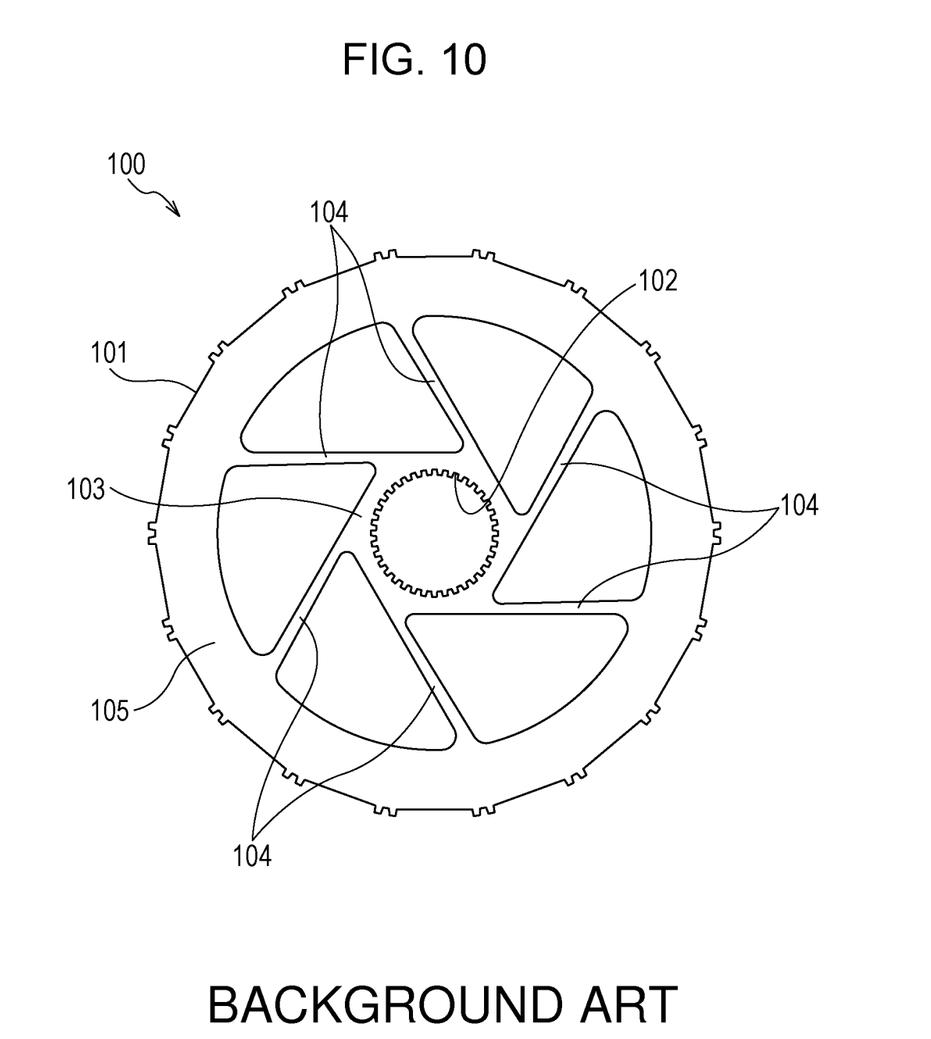
FIG. 10 is a front view of a rotor described in Japanese Patent No. 3746885.

As illustrated in FIG. 10, a rotor 100 described in Japanese Patent No. 3746885 includes a rotor core 101. The rotor core 101 has an inner circumferential portion 103 that surrounds a shaft press-fit hole 102, a plurality of ribs 104 that extend outwards from the inner circumferential portion 103, and an outer circumferential portion 105 that connects the distal ends of the ribs 104.

The plurality of ribs 104 are inclined by a predetermined angle in the circumferential direction, and have a so-called pinwheel configuration. This configuration reduces distortion of the ribs 104 in the axial direction.

Figure 11:
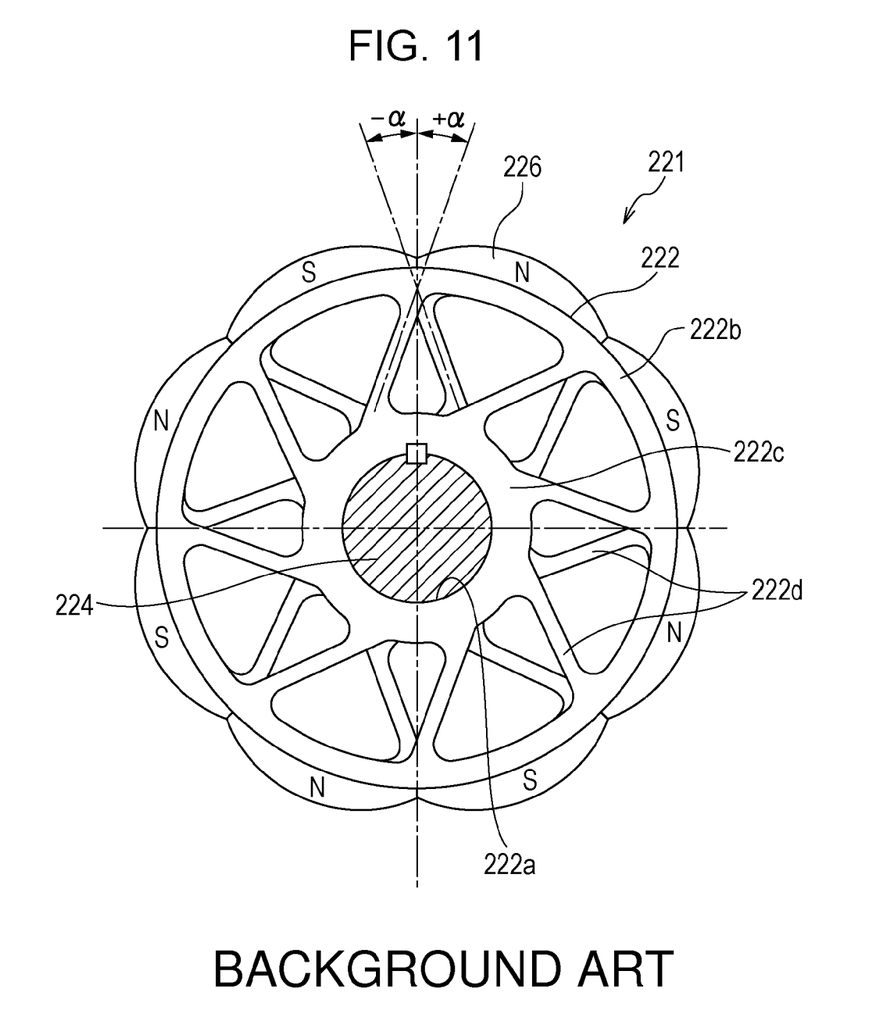
FIG. 11 is a front view of a rotor described in Japanese Unexamined Patent Application Publication No. 2004-194419.

As illustrated in FIG. 11, a rotor 221 described in Japanese Unexamined Patent Application Publication No. 2004-194419 has a rotor core 222. The rotor core 222 has an outer circumferential portion 222b, an inner circumferential portion 222c, and a plurality of ribs 222d that connect the outer circumferential portion 222b and the inner circumferential portion 222c. In addition, a rotating shaft 224 is fitted and secured into a shaft hole 222a in the center portion of the rotor core 222, and a plurality of permanent magnets 226 are bonded and secured to the outer circumferential surface.

The plurality of ribs 222d are arranged so as to be inclined at an angle α in directions opposite to each other in the circumferential direction, so that adjacent ribs 222d are symmetrical to each other. By arranging the plurality of ribs 222d in a so-called spoke configuration in this way, the strength of the ribs 222d is improved, and the width of the ribs 222d is reduced (narrowed), thereby reducing the weight of the rotor core 222.

SUMMARY

According to one aspect of the present invention, a rotor for a rotating electric machine includes a rotor core, a plurality of permanent magnets, and a rotating shaft. The rotor core has a substantially annular shape and a rotation axis around which the rotor core is to be rotated. The rotor core includes a shaft hole extending along the rotation axis and a plurality of magnet insertion holes provided with predetermined intervals in a circumferential direction of the rotor core. The plurality of permanent magnets are provided in the plurality of magnet insertion holes, respectively. The rotating shaft is press-fitted into the shaft hole provided in the rotor core. The rotor core includes a through-hole, an inner circumference-side rotor core, an outer circumference-side rotor core, and a plurality of ribs. The through-hole is provided on a first inner circumference side of the magnet insertion holes. The through-hole has a substantially annular shape and penetrates the rotor core along the rotation axis. The inner circumference-side rotor core is located on a second inner circumference side of the through-hole. The outer circumference-side rotor core is located on an outer circumference side of the through-hole. The plurality of ribs connect the inner circumference-side rotor core and the outer circumference-side rotor core. The plurality of ribs are arranged at predetermined intervals in the circumferential direction. Each of the plurality of ribs includes a first curved rib, and a second curved rib. The first curved rib extends to one side in the circumferential direction from an inner circumference side toward an outer circumference side. The first curved rib has a curved shape that bulges toward the outer circumference side and toward another side in the circumferential direction beyond a straight line that connects a first connecting portion between the first curved rib and the inner circumference-side rotor core and a second connecting portion between the first curved rib and the outer circumference-side rotor core. The second curved rib extends to the another side in the circumferential direction from the inner circumference side toward the outer circumference side. The second curved rib has a curved shape that bulges toward the outer circumference side and toward the one side in the circumferential direction beyond a straight line that connects a third connecting portion between the second curved rib and the inner circumference-side rotor core and a fourth connecting portion between the second curved rib and the outer circumference-side rotor core.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, a rotor for a rotating electric machine according to an embodiment of the present disclosure will be described.

Figure 1:
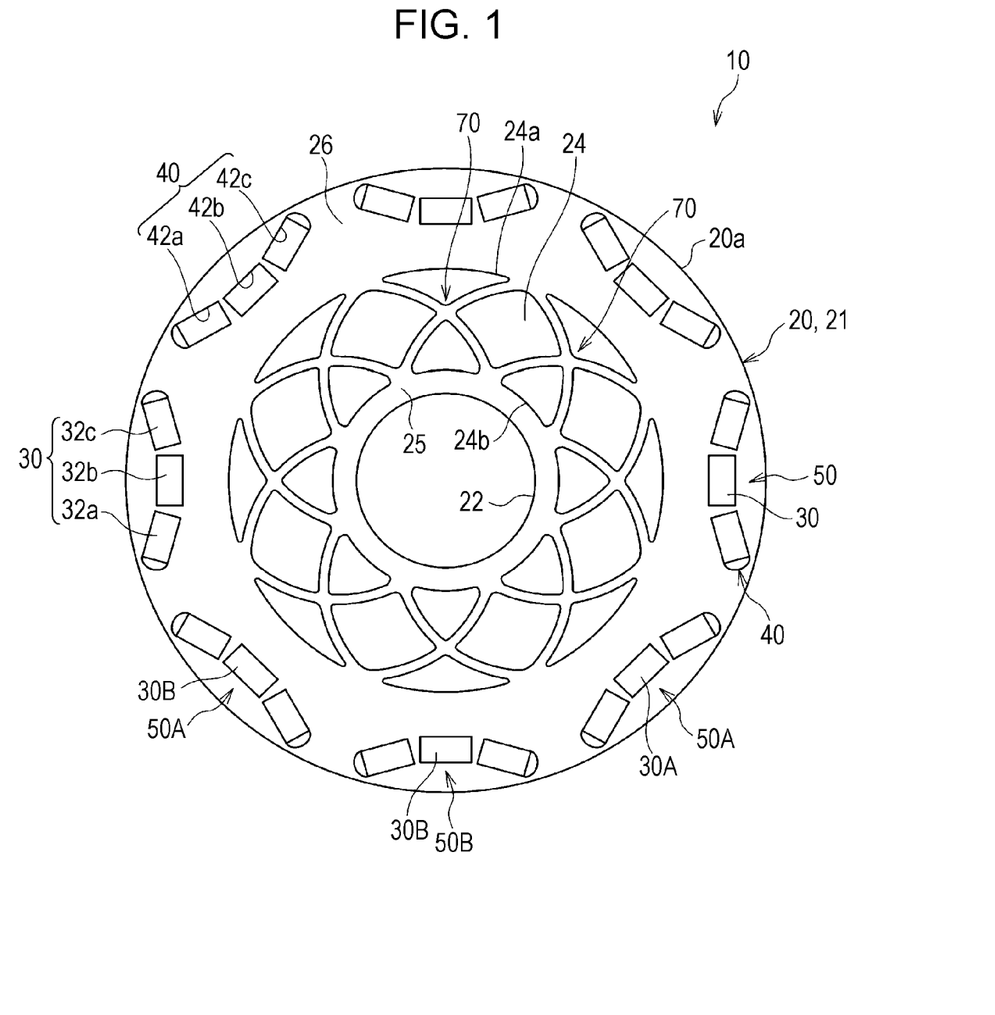
FIG. 1 is a front view of a rotor according to an embodiment.
Figure 2:
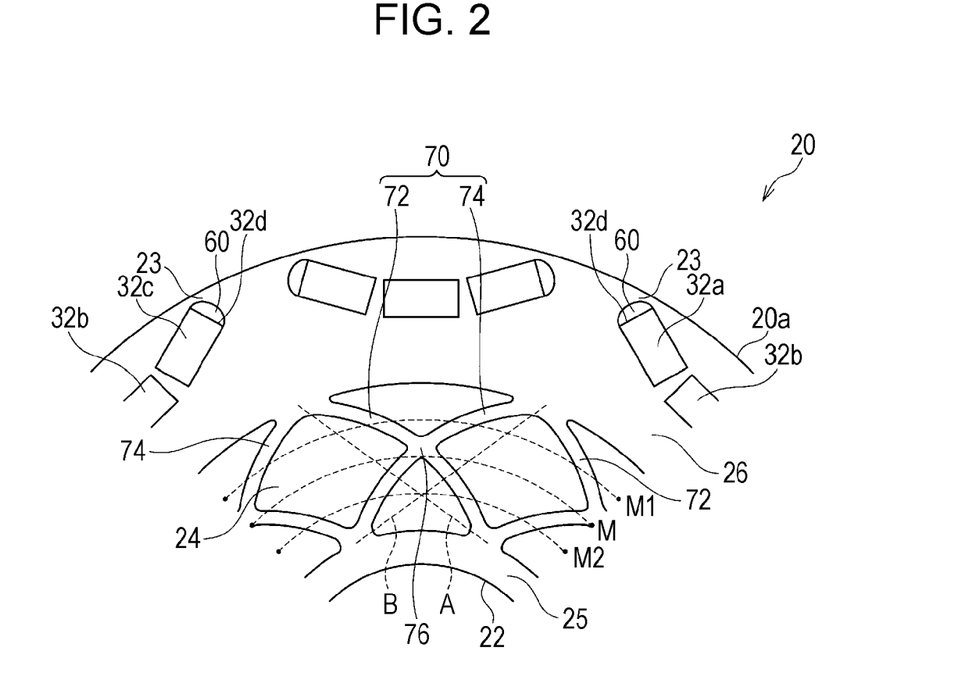
FIG. 2 is a partial enlarged view of the rotor illustrated in FIG. 1.

As illustrated in FIGS. 1 and 2, a rotor 10 for a rotating electric machine according to the embodiment includes a rotor core 20, and a rotating shaft (not illustrated). The rotor core 20 is substantially annular-shaped, and has a plurality of magnetic pole portions 50 that are formed at predetermined intervals in the circumferential direction. The rotating shaft is press-fitted into a shaft hole 22 formed in the central portion of the rotor core 20. The rotor 10 is arranged on the inner circumference side of a stator (not illustrated).

The rotor core 20 is formed by laminating a number of annular silicon steel sheets 21 having substantially the same shape. The rotor core 20 has a plurality of magnet insertion holes 40 formed at predetermined intervals in the circumferential direction.

The magnetic pole portions 50 have a permanent magnet 30 inserted into each of the magnet insertion holes 40 so as to be magnetized in the radial direction, and alternately differ in magnetization direction in the circumferential direction. More specifically, in a magnetic pole portion 50A having a permanent magnet 30A inserted in each of the magnet insertion holes 40, provided that its outer circumference side is the N-pole, in a magnetic pole portion 50B adjacent to the magnetic pole portion 50A, a permanent magnet 30B is inserted in each of the magnet insertion holes 40 in such a way that its outer circumference side is the S-pole.

The permanent magnet 30 is divided in three in the circumferential direction, into three permanent magnet pieces 32a, 32b, and 32c. The permanent magnet pieces 32a, 32b, and 32c have the same substantially rectangular cross-sectional shape.

Each of the magnet insertion holes 40 is divided in three in the circumferential direction, into three voids 42a, 42b, and 42c. The permanent magnet pieces 32a, 32b, and 32c are inserted and secured into the three voids 42a, 42b, and 42c, respectively. The three voids 42a, 42b, and 42c are formed in a substantially V-shape so that the outer circumferential surfaces of the permanent magnet pieces 32a, 32b, and 32c that are adjacent to each other in the circumferential direction form an angle of less than 180° to each other.

The rotor core 20 also has a side barrier portion 60 (see FIG. 2) formed in a portion of the rotor core 20 which is adjacent to a circumferentially outer side end face 32d of each of the permanent magnet pieces 32a and 32c. The side barrier portion 30 penetrates the rotor core 20 in the axial direction to define a magnetic gap. Because the rotor core 20 has the side barrier portion 60 formed in this way, a circumferential rib 23 extending in the circumferential direction is provided between the side barrier portion 60 and an outer circumferential surface 20a of the rotor core 20.

The circumferential rib 23 has a relatively short width in the radial direction. This prevents the magnetic flux generated from the outer circumferential surface of the permanent magnet 30 from short-circuiting to the inner circumferential surface of the same permanent magnet 30 via the circumferential rib 23, or from short-circuiting to the inner circumferential surface of the permanent magnet 30 forming the adjacent magnetic pole portion 50 via the circumferential rib 23.

In the rotor core 20, a through-hole 24 is formed on the inner circumference side of the magnet insertion holes 40. The through-hole 24 has a substantially annular shape, and penetrates the rotor core 20 in the axial direction. The through-hole 24 has an inner circumferential surface 24a and an outer circumferential surface 24b that are parallel to the outer circumferential surface 20a and the shaft hole 22 of the rotor core 20. Because the through-hole 24 is formed in this way, the rotor core 20 has an inner circumference-side rotor core 25 located on the inner circumference side of the through-hole 24, and an outer circumference-side rotor core 26 located on the outer circumference side of the through-hole 24.

The inner circumference-side rotor core 25 and the outer circumference-side rotor core 26 are connected by a plurality of ribs 70 that are arranged at predetermined intervals in the circumferential direction. Each of the ribs 70 includes a first curved rib 72 and a second curved rib 74. The first curved rib 72 extends to one side in the circumferential direction (left side in FIG. 2) from the inner circumference side toward the outer circumference side, and has a curved shape that bulges toward the outer circumference side and toward the other side in the circumferential direction (right side in FIG. 2) beyond a straight line (indicated by a broken line A in FIG. 2) that connects the respective connecting portions of the first curved rib 72 with the inner circumference-side rotor core 25 and the outer circumference-side rotor core 26. The second curved rib 74 extends to the other side in the circumferential direction from the inner circumference side toward the outer circumference side, and has a curved shape that bulges toward the outer circumference side and toward the one side in the circumferential direction beyond a straight line (indicated by a broken line B in FIG. 2) that connects the respective connecting portions of the second curved rib 74 with the inner circumference-side rotor core 25 and the outer circumference-side rotor core 26.

At the connecting position with the outer circumference-side rotor core 26, the outer circumference-side end portion of the first curved rib 72 is connected and contact-coupled to the outer circumference-side end portion of the second curved rib 74 forming the adjacent rib 70. Likewise, at its connecting position with the inner circumference-side rotor core 25, the inner circumference-side end portion of the first curved rib 72 is connected and contact-coupled to the inner circumference-side end portion of the second curved rib 74 forming the adjacent rib 70. This configuration allows the circumferential length of each of the first curved rib 72 and the second curved rib 74 to be extended.

The first curved rib 72 and the second curved rib 74 cross each other at a position inside the through-hole 24, and are connected to each other at the crossing position, forming a connecting portion 76.

In this regard, preferably, with respect to the radial direction, the connecting portion 76 is located closer to the radially middle portion M of the through-hole 24 than to the outer circumference-side rotor core 26 and the inner circumference-side rotor core 25. That is, when the portion located in the middle between the outer circumference-side rotor core 26 and the radially middle portion M of the through-hole 24 is defined as outer circumference-side middle portion M1, and the portion located in the middle between the inner circumference-side rotor core 25 and the radially middle portion M of the through-hole 24 is defined as inner circumference-side middle portion M2, with respect to the radial direction, the connecting portion 76 is preferably located between the outer circumference-side middle portion M1 and the inner circumference-side middle portion M2. In the embodiment, the connecting portion 76 is located between the radially middle portion M and the outer circumference-side middle portion M1 with respect to the radial direction.

Figure 3:
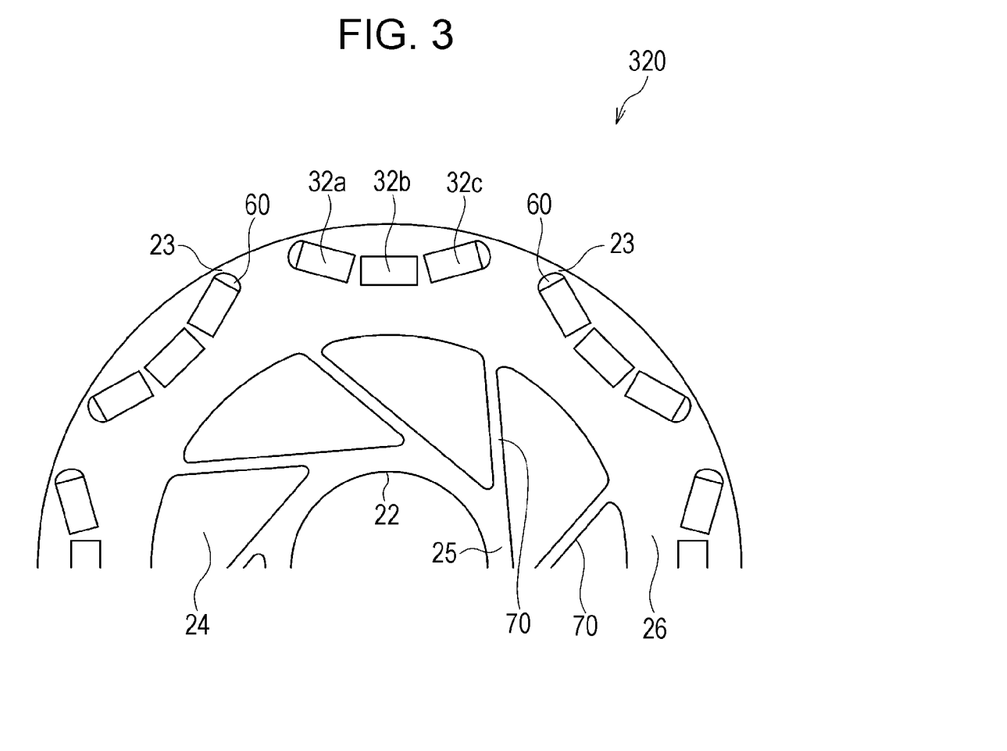
FIG. 3 is a partial enlarged view of a rotor according to Comparative Example 1.

Next, in order to make a comparison between the rotor core 20 according to the embodiment, and a rotor core 320 (see FIG. 3) according to Comparative Example 1 in which the ribs 70 are inclined by a predetermined angle in a so-called pinwheel configuration as in related art, an analysis was conducted on the stress generated in each of the rotors 20 and 320. The above-mentioned related art is described in, for example, Japanese Patent No. 3746885, the entire contents of which are incorporated herein by reference.

Figure 4:
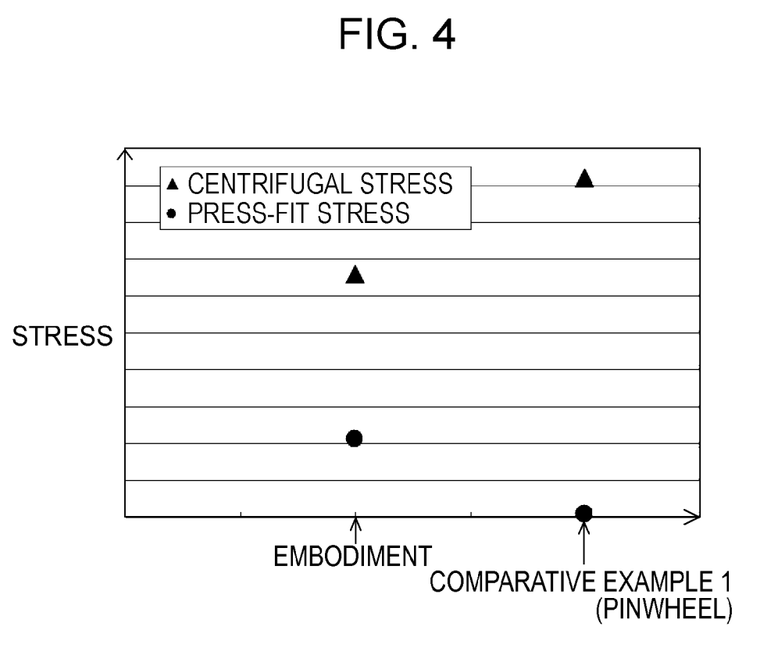
FIG. 4 illustrates centrifugal stress and press-fit stress in groove portions of a rotor core.

FIG. 4 illustrates the results obtained by simulation for centrifugal stress generated in the circumferential rib 23 of the rotor core 20, which is a location where high stress tends to occur, and press-fit stress.

The centrifugal stress mentioned above means stress created by the centrifugal force acting on the rotor core 20, when the rotor core 20 is rotated in a state in which the rotating shaft is not press-fitted in the shaft hole 22. The press-fit stress means stress generated in the rotor core 20 when the rotating shaft is press-fitted into the shaft hole 22 in a state in which the rotor core 20 is not rotated.

It is appreciated from FIG. 4 that the centrifugal stress is reduced in the embodiment in comparison to Comparative Example 1. This is due to the fact that the ribs 70 according to the embodiment have high rigidity in comparison to Comparative Example 1.

That is, because the first and second curved ribs 72 and 74 constituting the ribs 70 according to the embodiment have a curved shape that bulges toward the outer circumference side, high rigidity of the ribs 70 can be maintained against a force that pulls the outer circumference-side rotor core 26 toward the outer circumference side. Further, the first and second curved ribs 72 and 74 have such curved shapes that bulge toward the other side and one side, respectively, in the circumferential direction, and form a pair with each other. Therefore, even when, upon application of a force that pulls the outer circumference-side rotor core 26 toward the outer circumference side, one of the curved ribs 72 and 74 is about to deform so as to open out, the other one of the curved ribs 74 and 72 provides resistance, thereby making it possible to maintain higher rigidity of the ribs 70. Because the connecting portion 76 is formed as the first and second curved ribs 72 and 74 are connected to each other at their crossing position, the rigidity of the first and second curved ribs 72 and 74 can be increased against a force that pulls the outer circumference-side rotor core 26 toward the outer circumference side.

By improving the rigidity of the ribs 70 against a force that pulls the outer circumference-side rotor core 26 toward the outer circumference side in this way, deformation of the outer circumference-side rotor core 26 can be reduced. Therefore, it is possible to reduce centrifugal stress generated around the magnet insertion holes 40, in particular, in the circumferential rib 23 of the rotor core 20 owing to the deformation.

Although press-fit stress increases in the embodiment in comparison to Comparative Example 1, from the perspective of overall performance that takes press-fit stress and centrifugal stress into account, stress is reduced, and thus superiority of the embodiment is maintained in this regard. This is due to the fact that in the embodiment, while the rigidity of the ribs 70 against a force that pulls the outer circumference-side rotor core 26 toward the outer circumference side is increased as described above, the ribs 70 readily deform under a force that pushes the inner circumference-side rotor core 25 from the inner circumference side toward the outer circumference side.

That is, because the first and second curved ribs 72 and 74 constituting the ribs 70 each have a curved shape that bulges toward the outer circumference side, the first and second curved ribs 72 and 74 undergo moderate deformation. Further, because the first and second curved ribs 72 and 74 cross each other at a position inside the through-hole 24, in comparison to a case in which the first and second curved ribs 72 and 74 do not cross each other, the circumferential length of each of the first and second curved ribs 72 and 74 can be made longer. In addition, when the rotating shaft is press-fitted into the shaft hole 22, the first and second curved ribs 72 and 74 readily undergo deformation. Moreover, at the connecting position with the outer circumference-side rotor core 26, the outer circumference-side end portion of the first curved rib 72 is connected to the outer circumference-side end portion of the second curved rib 74, and at the connecting position with the inner circumference-side rotor core 25, the inner circumference-side end portion of the first curved rib 72 is connected to the inner circumference-side end portion of the second curved rib 74. Therefore, in comparison to a case in which the respective inner circumference-side end portions and outer circumference-side end portions of the first and second curved ribs 72 and 74 are not connected to each other, each of the first and second curved ribs 72 and 74 can be made to have a longer circumferential length, and readily deforms when the rotating shaft is press-fitted into the shaft hole 22.

Because the ribs 70 are readily deformable as described above, press-fit displacement of the inner circumference-side rotor core 25 is absorbed, thereby making it possible to reduce press-fit stress generated in the interior of the outer circumference-side rotor core 26.

Examples 1 to 4

Next, an analysis was conducted on how stress generated in the rotor core 20 varies as the radial position of the connecting portion 76 is varied.

In the rotor core 20 illustrated in each of FIGS. 5A to 5D, the radial position of the connecting portion 76 is varied by varying the radius of curvature of the first curved rib 72 and the second curved rib 74.

Figure 5A:
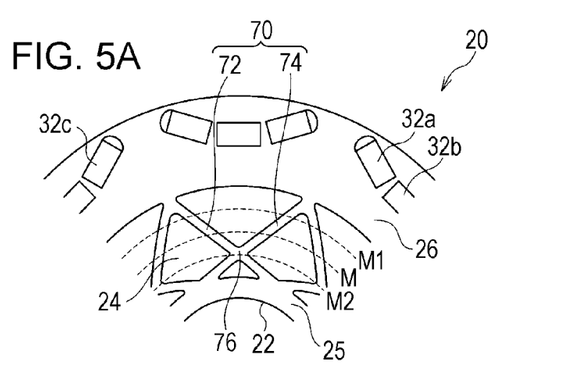
FIGS. 5A to 5D are partial enlarged views of a rotor according to Examples 1 to 4, respectively.

Specifically, in the rotor core 20 according to Example 1 illustrated in FIG. 5A, the radius of curvature is set to R1000. Therefore, the first curved rib 72 and the second curved rib 74 have a nearly linear shape, and the connecting portion 76 is located on the inner circumference-side middle portion M2.

Figure 5B:
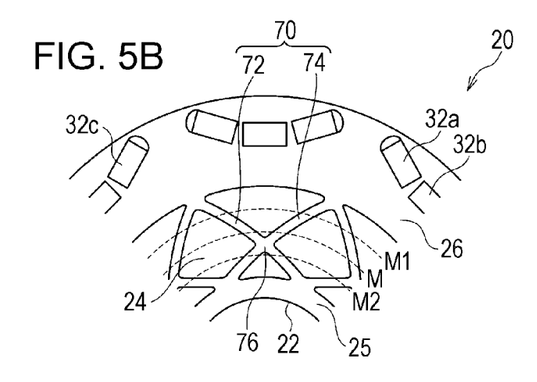

In the rotor core 20 according to Example 2 illustrated in FIG. 5B, the radius of curvature of the first curved rib 72 and the second curved rib 74 is set to R150, and accordingly, the connecting portion 76 is located between the radially middle portion M and the inner circumference-side middle portion M2.

Figure 5C:
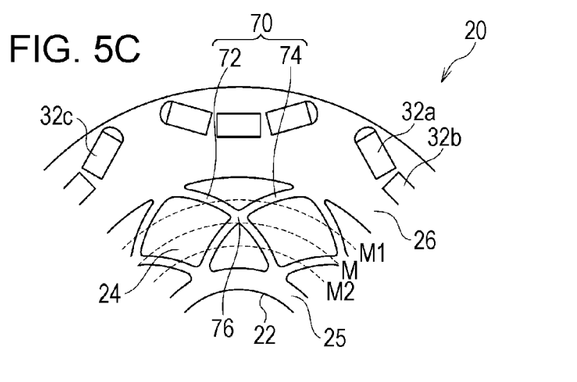

In the rotor core 20 according to Example 3 illustrated in FIG. 5C, the radius of curvature of the first curved rib 72 and the second curved rib 74 is set to R65, and accordingly, the connecting portion 76 is located between the radially middle portion M and the outer circumference-side middle portion M1.

Figure 5D:
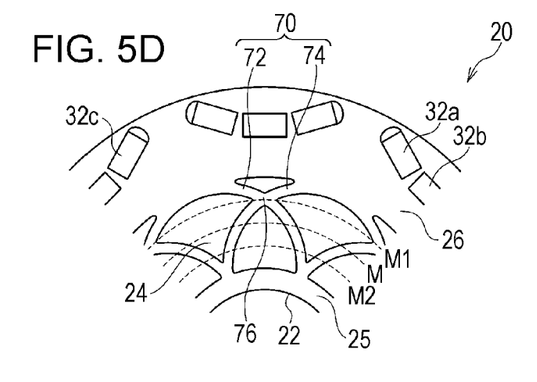

In the rotor core 20 according to Example 4 illustrated in FIG. 5D, the radius of curvature of the first curved rib 72 and the second curved rib 74 is set to R45, and accordingly, the connecting portion 76 is located on the outer circumference-side middle portion M1.

Figure 6:
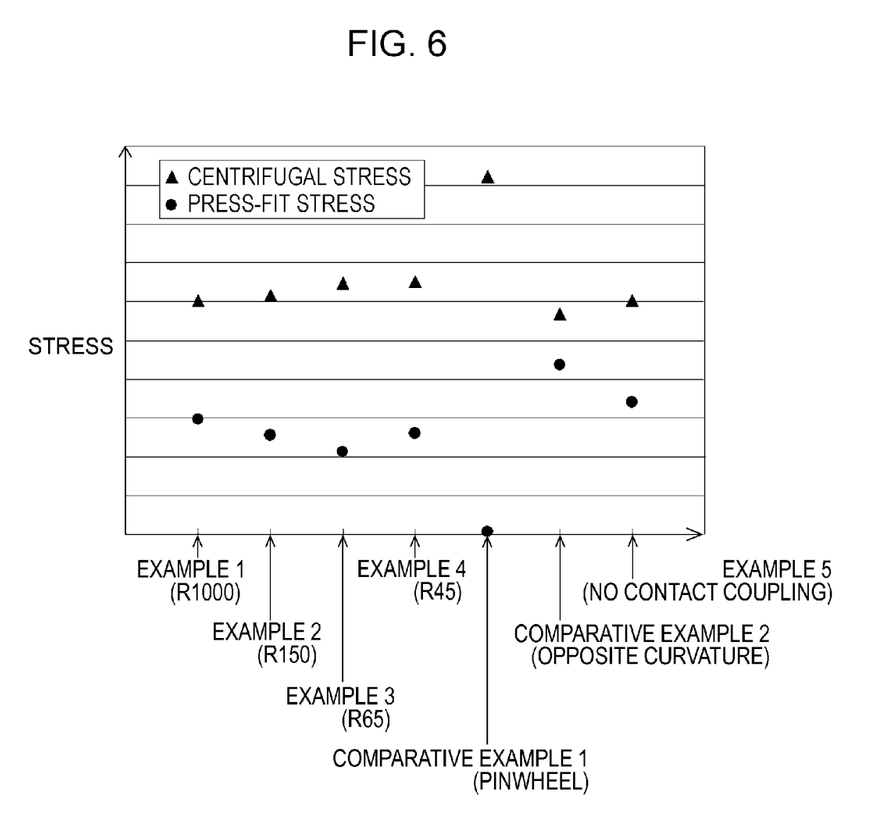
FIG. 6 illustrates centrifugal stress and press-fit stress in groove portions of a rotor core.
Figure 7:
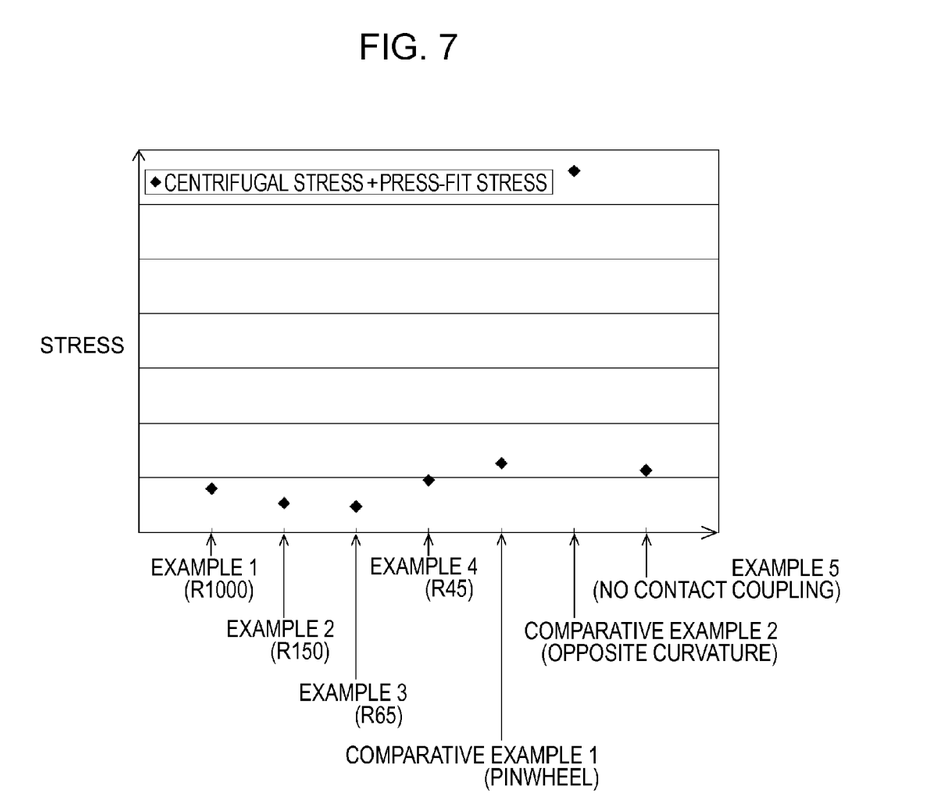
FIG. 7 illustrates maximum stress inside a rotor core.

FIG. 6 illustrates the results obtained by simulation for centrifugal stress generated in the circumferential rib 23 of the rotor core 20, which is a location where high stress tends to occur, and press-fit stress. FIG. 7 illustrates the results obtained by simulation for the value at a location within the rotor core 20 where the highest stress occurs (maximum stress), in a case in which the rotor core 20 is rotated with the rotating shaft being press-fitted in the shaft hole 22. That is, the results illustrated in FIG. 7 take both centrifugal stress and press-fit stress into account, and represent the maximum stress generated in the rotor core 20 under conditions corresponding to those during actual operation. Therefore, FIG. 7 illustrates that the lower the stress in FIG. 7, the higher the strength of the rotor core during actual operation.

For reference, FIGS. 6 and 7 also illustrate the results for the rotor core 320 (see FIG. 3) according to Comparative Example 1 mentioned above in which the ribs 70 have a pinwheel configuration. While FIGS. 6 and 7 also illustrate the results for Comparative Example 2 and Example 5, these will be described later.

It is appreciated from FIG. 6 that as the radius of curvature of the first curved rib 72 and the second curved rib 74 becomes larger, the rigidity of the ribs 70 becomes higher, indicating improved centrifugal stress reducing effect. Further, as the above-mentioned radius of curvature becomes larger, the first curved rib 72 and the second curved rib 74 become closer to a linear shape, and hence the ribs 70 become less likely to deform, and press-fit stress tends to increase. In particular, in the case of the rotor core 20 according to Example 1 illustrated in FIG. 5A, the connecting portion 76 is located on the inner circumference-side middle portion M2. Therefore, deformation of the first curved rib 72 and the second curved rib 74 is likely to be hindered by the connecting portion 76, resulting in an increase in press-fit stress. The same is true for the rotor core 20 according to Example 4 illustrated in FIG. 5D. In this case, because the connecting portion 76 is located on the outer circumference-side middle portion M1, deformation of the first curved rib 72 and the second curved rib 74 is likely to be hindered by the connecting portion 76. Therefore, even though the above-mentioned radius of curvature is set to a lower value than in Example 2 and Example 3, press-fit stress increases.

Further, referring to FIG. 7, it is appreciated that in Example 2 and Example 3 that can reduce centrifugal stress and press-fit stress in a well-balanced manner, the maximum stress within the rotor core 20 under conditions corresponding to those during actual operation is reduced. As described above, it was found that under conditions corresponding to those during actual operation, the rotor core 20 according to Example 2 and Example 3 is preferred, that is, the connecting portion 76 is preferably located closer to the radially middle portion M of the through-hole 24, than to the outer circumference-side rotor core 26 and the inner circumference-side rotor core 25.

Comparative Example 2

Next, an analysis was conducted on how stress generated in a rotor core 420 according to Comparative Example 2 varies.

Figure 8:
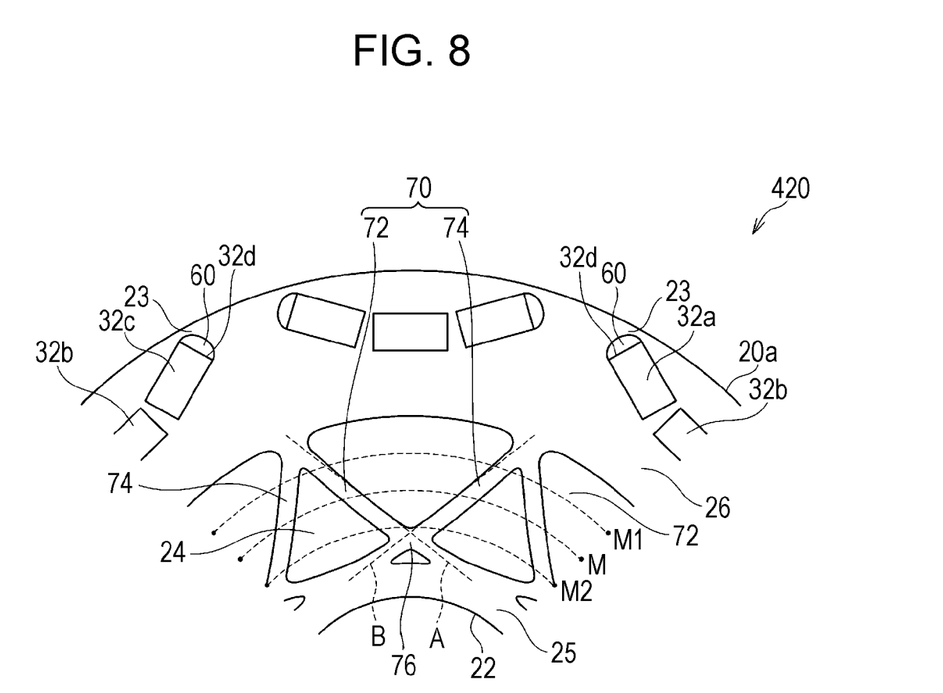
FIG. 8 is a partial enlarged view of a rotor according to Comparative Example 2.

As illustrated in FIG. 8, in the rotor core 420 according to Comparative Example 2, the first curved rib 72 has a curved shape that bulges toward the inner circumference side and toward one side in the circumferential direction (left side in FIG. 8) beyond a straight line (indicated by a broken line A in FIG. 8) that connects the respective connecting portions of the first curved rib 72 with the inner circumference-side rotor core 25 and the outer circumference-side rotor core 26. The second curved rib 74 has a curved shape that bulges toward the inner circumference side and toward the other side in the circumferential direction (right side in FIG. 8) beyond a straight line (indicated by a broken line B in FIG. 8) that connects the respective connecting portions of the second curved rib 74 with the inner circumference-side rotor core 25 and the outer circumference-side rotor core 26. That is, in Examples 1 to 4, the centers of curvature of the first curved rib 72 and second curved rib 74 are located on one side and the other side of the straight lines A and B in the circumferential direction, respectively, whereas in Comparative Example 2, the centers of curvature of the first curved rib 72 and second curved rib 74 are located on the other side and one side, respectively, of the straight lines A and B in the circumferential direction. In this way, in Comparative Example 2, the first curved rib 72 and the second curved rib 74 are formed with an opposite curvature to Examples 1 to 4.

It is appreciated from FIG. 6 that in the rotor core 420 according to Comparative Example 2, the rigidity of the ribs 70 increases, and centrifugal stress is reduced in comparison to Examples 1 to 4. However, in Comparative Example 2, because the ribs 70 are formed with the opposite curvature, the ribs 70 do not readily deform under a force that pushes the inner circumference-side rotor core 25 from the inner circumference side toward the outer circumference side, resulting in very large press-fit stress. Further, in Comparative Example 2, the maximum stress within the rotor core 420 becomes very large (see FIG. 7) if both press-fit stress and centrifugal stress are taken into account. Therefore, it was found that the rotor core 420 according to Comparative Example 2 is not appropriate from the viewpoint of stress reduction.

Example 5

Next, an analysis was conducted on how stress generated in the rotor core 20 according to Example 5 varies.

Figure 9:
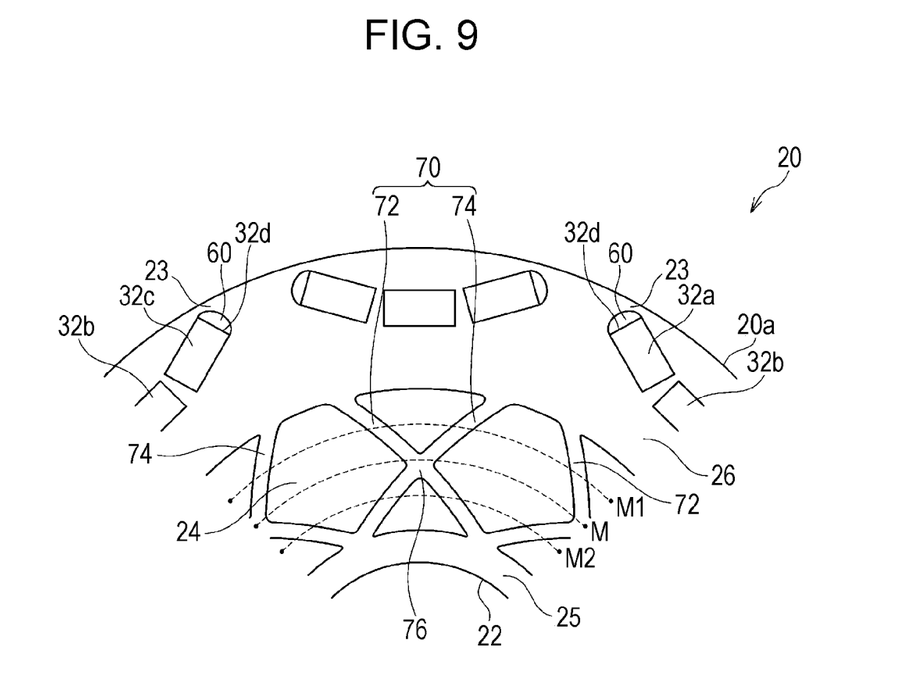
FIG. 9 is a partial enlarged view of a rotor according to Example 5.

As illustrated in FIG. 9, in the rotor core 20 according to Example 5, at the connecting position with the inner circumference-side rotor core 25, the inner circumference-side end portion of the first curved rib 72 is connected and contact-coupled to the inner circumference-side end portion of the second curved rib 74 forming the adjacent rib 70. To the contrary, at the connecting position with the outer circumference-side rotor core 26, the outer circumference-side end portion of the first curved rib 72 is not connected to the outer circumference-side end portion of the second curved rib 74 forming the adjacent rib 70. In this case, the circumferential length of each of the first curved rib 72 and the second curved rib 74 is short in comparison to other Examples 1 to 4.

According to FIG. 6, in Example 5, centrifugal stress decreases and press-fit stress increases in comparison to other examples. Conceivably, this is due to the fact that because the circumferential length of each of the first curved rib 72 and the second curved rib 74 is short as described above, the ribs 70 do not readily deform under a force that pushes the inner circumference-side rotor core 25 from the inner circumference side toward the outer circumference side, which makes it difficult to absorb press-fit displacement of the inner circumference-side rotor core 25. As a result, as illustrated in FIG. 7, it was found that in Example 5, although larger than in other examples, the maximum stress in the rotor core is small in comparison to Comparative Examples 1 and 2, indicating that Example 5 provides a good stress reducing effect.

As discussed in the foregoing, in the rotor 10 for a rotating electric machine according to the embodiment, the inner circumference-side rotor core 25 and the outer circumference-side rotor core 26 are connected by the plurality of ribs 70 arranged at predetermined intervals in the circumferential direction. Each of the ribs 70 has the first curved rib 72 and the second curved rib 74. The first curved rib 72 extends to one side in the circumferential direction from the inner circumference side toward the outer circumference side, and has a curved shape that bulges toward the outer circumference side and toward the other side in the circumferential direction beyond the straight line A that connects the respective connecting portions of the first curved rib 72 with the inner circumference-side rotor core 25 and the outer circumference-side rotor core 26. The second curved rib 74 extends to the other side in the circumferential direction from the inner circumference side toward the outer circumference side, and has a curved shape that bulges toward the outer circumference side and toward the one side in the circumferential direction beyond the straight line B that connects the respective connecting portions of the second curved rib 74 with the inner circumference-side rotor core 25 and the outer circumference-side rotor core 26. When the rotating shaft is press-fitted into the shaft hole 22, the resulting displacement (press-fit displacement) of the inner circumference-side rotor core 25 from the central portion toward the outer circumference side causes stress (press-fit stress) to be generated in the interior of the outer circumference-side rotor core 26 via the ribs 70. However, in the embodiment, the first and second curved ribs 72 and 74 constituting the ribs 70 each have a curved shape that bulges toward the outer circumference side. Therefore, as the first and second curved ribs 72 and 74 undergo moderate deformation under a force that pushes the inner circumference-side rotor core 25 from the inner circumference side toward the outer circumference side, the press-fit displacement is absorbed, thereby making it possible to reduce press-fit stress generated in the interior of the outer circumference-side rotor core 26. During rotation, owing to the centrifugal force acting on the rotor core 20 itself, the outer circumference-side rotor core 26 is pulled and deforms toward the outer circumference side, causing stress (centrifugal stress) to be exerted in the interior of the rotor core 20, in particular, around the magnet insertion holes 40. However, in the embodiment, the first and second curved ribs 72 and 74 constituting the ribs 70 each have a curved shape that bulges toward the outer circumference side. Therefore, high rigidity of the ribs 70 can be maintained against a force that pulls the outer circumference-side rotor core 26 toward the outer circumference side. Further, the first and second curved ribs 72 and 74 constituting the ribs 70 have curved shapes that bulge toward the other side and one side, respectively, in the circumferential direction, and are symmetrical to each other. Therefore, it is possible to maintain higher rigidity of the ribs 70 against the force that pulls the outer circumference-side rotor core 26 toward the outer circumference side. By increasing the rigidity of the ribs 70 in this way, deformation of the outer circumference-side rotor core 26 can be reduced, thereby making it possible to reduce centrifugal stress generated around the magnet insertion holes 40 owing to the deformation.

Because the first and second curved ribs 72 and 74 cross each other at a position inside the through-hole 24, in comparison to a case in which the first and second curved ribs 72 and 74 do not cross each other, the circumferential length of each of the first and second curved ribs 72 and 74 can be made longer. In addition, when the rotating shaft is press-fitted into the shaft hole 22, the first and second curved ribs 72 and 74 readily undergo deformation. Therefore, it is possible to reduce press-fit stress generated in the outer circumference-side rotor core 26 more effectively. Further, the first and second curved ribs 72 and 74 are connected to each other at their crossing position to form the connecting portion 76. Therefore, the rigidity of the first and second curved ribs 72 and 74 is increased against a force that pulls the outer circumference-side rotor core 26 toward the outer circumference side, and deformation of the outer circumference-side rotor core 26 can be reduced more effectively. Therefore, it is possible to reduce centrifugal stress generated around the magnet insertion holes 40 owing to the deformation more effectively.

With respect to the radial direction, the connecting portion 76 is located closer to the radially middle portion of the through-hole, than to the outer circumference-side rotor core 26 and the inner circumference-side rotor core 25. Therefore, it is possible to prevent deformation of the first and second curved ribs 72 and 74 from being hindered by the connecting portion 76 when the rotating shaft is press-fitted into the shaft hole 22 of the rotor core 20, thereby reducing press-fit stress generated in the outer circumference-side rotor core 26 more effectively.

At the connecting position with the outer circumference-side rotor core 26, the outer circumference-side end portion of the first curved rib 72 is connected to the outer circumference-side end portion of the second curved rib 74, and at the connecting position with the inner circumference-side rotor core 25, the inner circumference-side end portion of the first curved rib 72 is connected to the inner circumference-side end portion of the second curved rib 74. Therefore, in comparison to a case in which the respective inner circumference-side end portions and outer circumference-side end portions of the first and second curved ribs 72 and 74 are not connected to each other, each of the first and second curved ribs 72 and 74 can be made to have a large circumferential length. Accordingly, when the rotating shaft is press-fitted into the shaft hole 22, the first and second curved ribs 72 and 74 readily undergo deformation, thereby making it possible to reduce press-fit stress generated in the outer circumference-side rotor core 26 more effectively.

It is to be understood that the rotor 10 for a rotating electric machine according to the present disclosure is not limited to the above-mentioned embodiment, but various modifications, improvements, and the like can be made as appropriate.

According to a first aspect of the present disclosure, there is provided a rotor (for example, a rotor 10 according to the embodiment described above) for a rotating electric machine, the rotor including a rotor core (for example, a rotor core 20 according to the embodiment described above) that has a substantially annular shape, the rotor core having a plurality of magnet insertion holes (for example, magnet insertion holes 40 according to the embodiment described above) that are formed at predetermined intervals in a circumferential direction, a permanent magnet (for example, a permanent magnet 30 according to the embodiment described above) that is inserted into each of the magnet insertion holes, and a rotating shaft that is press-fitted into a shaft hole (for example, a shaft hole 22 according to the embodiment described above) formed in a central portion of the rotor core. The rotor core has a through-hole (for example, a through-hole 24 according to the embodiment described above) that is located on an inner circumference side of the magnet insertion holes, the through-hole having a substantially annular shape and penetrating the rotor core in an axial direction, an inner circumference-side rotor core (for example, an inner circumference-side rotor core 25 according to the embodiment described above) that is located on an inner circumference side of the through-hole, and an outer circumference-side rotor core (for example, an outer circumference-side rotor core 26 according to the embodiment described above) that is located on an outer circumference side of the through-hole. The inner circumference-side rotor core and the outer circumference-side rotor core are connected by a plurality of ribs (for example, ribs 70 according to the embodiment described above), the ribs being arranged at predetermined intervals in the circumferential direction. Each of the ribs has a first curved rib (for example, a first curved rib 72 according to the embodiment described above) that extends to one side in the circumferential direction from an inner circumference side toward an outer circumference side, the first curved rib having a curved shape that bulges toward the outer circumference side and toward another side in the circumferential direction beyond a straight line (for example, a straight line A according to the embodiment described above) that connects respective connecting portions of the first curved rib with the inner circumference-side rotor core and the outer circumference-side rotor core, and a second curved rib (for example, a second curved rib 74 according to the embodiment described above) that extends to the other side in the circumferential direction from the inner circumference side toward the outer circumference side, the second curved rib having a curved shape that bulges toward the outer circumference side and toward the one side in the circumferential direction beyond a straight line (for example, a straight line B according to the embodiment described above) that connects respective connecting portions of the second curved rib with the inner circumference-side rotor core and the outer circumference-side rotor core.

According to the first aspect of the present disclosure, the inner circumference-side rotor core and the outer circumference-side rotor core are connected by the plurality of ribs arranged at predetermined intervals in the circumferential direction. Each of the ribs has the first curved rib and the second curved rib. The first curved rib extends to one side in the circumferential direction from the inner circumference side toward the outer circumference side, and has a curved shape that bulges toward the outer circumference side and toward the other side in the circumferential direction beyond the straight line that connects the respective connecting portions of the first curved rib with the inner circumference-side rotor core and the outer circumference-side rotor core. The second curved rib extends to the other side in the circumferential direction from the inner circumference side toward the outer circumference side, and has a curved shape that bulges toward the outer circumference side and toward the one side in the circumferential direction beyond the straight line that connects the respective connecting portions of the second curved rib with the inner circumference-side rotor core and the outer circumference-side rotor core. When the rotating shaft is press-fitted into the shaft, the resulting displacement (press-fit displacement) of the inner circumference-side rotor core from the central portion toward the outer circumference side causes stress (press-fit stress) to be generated in the interior of the outer circumference-side rotor core via the ribs. However, in the first aspect of the present disclosure, the first and second curved ribs constituting the ribs each have a curved shape that bulges toward the outer circumference side. Therefore, as the first and second curved ribs undergo moderate deformation under a force that pushes the inner circumference-side rotor core from the inner circumference side toward the outer circumference side, the press-fit displacement is absorbed, thereby making it possible to reduce press-fit stress generated in the interior of the outer circumference-side rotor core. During rotation, owing to the centrifugal force acting on the rotor core itself, the outer circumference-side rotor core is pulled and deforms toward the outer circumference side, causing stress (centrifugal stress) to be exerted in the interior of the rotor core, in particular, around the magnet insertion holes. However, in the first aspect of the present disclosure, the first and second curved ribs constituting the ribs each have a curved shape that bulges toward the outer circumference side. Therefore, high rigidity of the ribs can be maintained against a force that pulls the outer circumference-side rotor core toward the outer circumference side. Further, the first and second curved ribs constituting the ribs have curved shapes that bulge toward the other side and one side, respectively, in the circumferential direction, and form a pair with each other. Therefore, even when, upon application of a force that pulls the outer circumference-side rotor core toward the outer circumference side, one of the curved ribs is about to deform so as to open out, the other one of the curved ribs provides resistance, thereby making it possible to maintain higher rigidity of the ribs. By increasing the rigidity of the ribs against a force that pulls the outer circumference-side rotor core toward the outer circumference side in this way, deformation of the outer circumference-side rotor core can be reduced. Therefore, it is possible to reduce centrifugal stress generated around the magnet insertion holes owing to the deformation.

In a second aspect of the present disclosure, in addition to the configuration according to the first aspect, the first curved rib and the second curved rib cross each other at a position inside the through-hole, and are connected to each other at the position to form a connecting portion (for example, a connecting portion 76 according to the embodiment described above).

According to the second aspect of the present disclosure, because the first and second curved ribs cross each other at a position inside the through-hole, in comparison to a case in which the first and second curved ribs do not cross each other, the circumferential length of each of the first and second curved ribs can be made longer. In addition, when the rotating shaft is press-fitted into the shaft hole, the first and second curved ribs readily undergo deformation. Therefore, it is possible to reduce press-fit stress generated in the outer circumference-side rotor core more effectively. Further, the first and second curved ribs are connected to each other at their crossing position to form the connecting portion. Therefore, the rigidity of the first and second curved ribs is increased against a force that pulls the outer circumference-side rotor core toward the outer circumference side, and deformation of the outer circumference-side rotor core can be reduced more effectively. Therefore, it is possible to reduce centrifugal stress generated around the magnet insertion holes owing to the deformation more effectively.

In a third aspect of the present disclosure, in addition to the configuration according to the second aspect, with respect to a radial direction, the connecting portion is located closer to a radially middle portion (for example, a radially middle portion M according to the embodiment described above) of the through-hole, than to the outer circumference-side rotor core and the inner circumference-side rotor core.

According to the third aspect of the present disclosure, with respect to the radial direction, the connecting portion is located closer to the radially middle portion of the through-hole, than to the outer circumference-side rotor core and the inner circumference-side rotor core. Therefore, it is possible to prevent deformation of the first and second curved ribs from being hindered by the connecting portion when the rotating shaft is press-fitted into the shaft hole of the rotor core, thereby reducing press-fit stress generated in the outer circumference-side rotor core more effectively.

In a fourth aspect of the present disclosure, in addition to the configuration according to the second aspect, an outer circumference-side end portion of the first curved rib is connected to an outer circumference-side end portion of the second curved rib, at a connecting portion of the first curved rib with the outer circumference-side rotor core, and an inner circumference-side end portion of the first curved rib is connected to an inner circumference-side end portion of the second curved rib, at a connecting portion of the first curved rib with the inner circumference-side rotor core.

According to the fourth aspect of the present disclosure, at the connecting position with the outer circumference-side rotor core, the outer circumference-side end portion of the first curved rib is connected to the outer circumference-side end portion of the second curved rib, and at the connecting position with the inner circumference-side rotor core, the inner circumference-side end portion of the first curved rib is connected to the inner circumference-side end portion of the second curved rib. Therefore, in comparison to a case in which the respective inner circumference-side end portions and outer circumference-side end portions of the first and second curved ribs are not connected to each other, each of the first and second curved ribs can be made to have a large circumferential length. Accordingly, when the rotating shaft is press-fitted into the shaft hole, the first and second curved ribs readily undergo deformation, thereby making it possible to reduce press-fit stress generated in the outer circumference-side rotor core more effectively.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor for a rotating electric machine, comprising:
   a rotor core having a substantially annular shape and a rotation axis around which the rotor core is to be rotated, the rotor core including a shaft hole extending along the rotation axis and a plurality of magnet insertion holes provided at predetermined intervals in a circumferential direction of the rotor core;
   a plurality of permanent magnets provided in the plurality of magnet insertion holes, respectively;
   a rotating shaft press-fitted into the shaft hole provided in the rotor core; and
   the rotor core comprising:
      a through-hole provided on a first inner circumference side of the magnet insertion holes, the through-hole having a substantially annular shape and penetrating the rotor core along the rotation axis;
      an inner circumference-side rotor core located on a second inner circumference side of the through-hole;
      an outer circumference-side rotor core located on an outer circumference side of the through-hole; and
      a plurality of ribs extending through the through-hole and connecting the inner circumference-side rotor core and the outer circumference-side rotor core, the plurality of ribs being arranged at predetermined intervals in the circumferential direction, each of the plurality of ribs comprising:
         a first curved rib extending to one side in the circumferential direction from an inner circumference side toward an outer circumference side, the first curved rib having a curved shape that bulges toward the outer circumference side and toward another side in the circumferential direction beyond a straight line that connects a first connecting portion between the first curved rib and the inner circumference-side rotor core and a second connecting portion between the first curved rib and the outer circumference-side rotor core; and
         a second curved rib extending to the another side in the circumferential direction from the inner circumference side toward the outer circumference side, the second curved rib having a curved shape that bulges toward the outer circumference side and toward the one side in the circumferential direction beyond a straight line that connects a third connecting portion between the second curved rib and the inner circumference-side rotor core and a fourth connecting portion between the second curved rib and the outer circumference-side rotor core,
   wherein the first curved rib and the second curved rib cross each other at a position inside the through-hole, and are connected to each other at the position to form a fifth connecting portion.

2. The rotor for a rotating electric machine according to claim 1, wherein with respect to a radial direction of the rotor core, the fifth connecting portion is located closer to a radially middle portion of the through-hole, than to the outer circumference-side rotor core and the inner circumference-side rotor core.

3. The rotor for a rotating electric machine according to claim 1, wherein:
   an outer circumference-side end portion of the first curved rib is connected to an outer circumference-side end portion of the second curved rib at the second connecting portion at which the first curved rib is connected to the outer circumference-side rotor core; and
   an inner circumference-side end portion of the first curved rib is connected to an inner circumference-side end portion of the second curved rib at the first connecting portion at which the first curved rib is connected to the inner circumference-side rotor core.

4. The rotor for a rotating electric machine according to claim 1, wherein an inner circumference-side end portion of the first curved rib is connected to an inner circumference-side end portion of the second curved rib at the first connecting portion at which the first curved rib is connected to the inner circumference-side rotor core.

5. The rotor for a rotating electric machine according to claim 1, wherein the first curved rib and the second curved rib are symmetrical to each other.

* * * * *